Patented Jan. 6, 1942

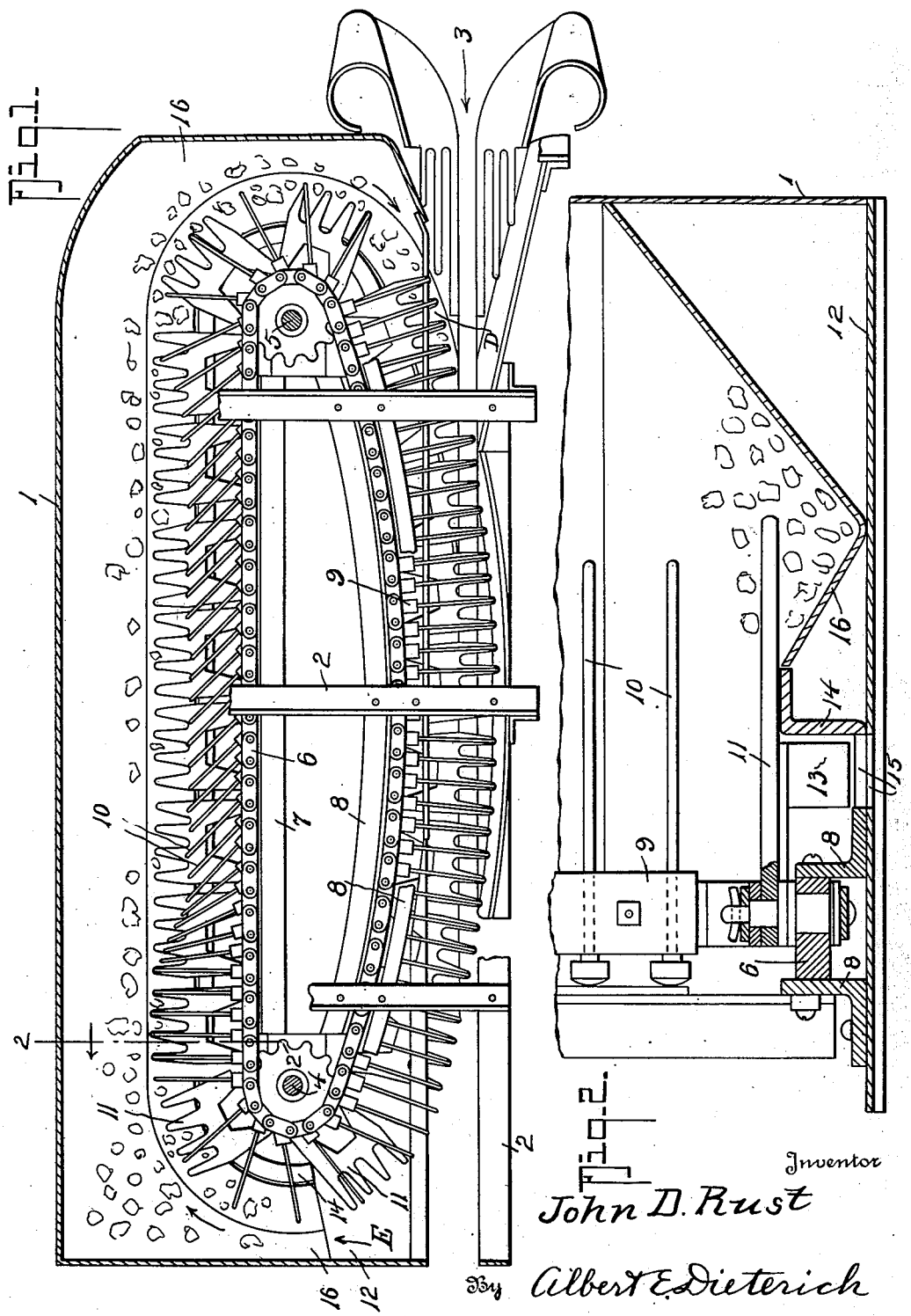

2,268,623

UNITED STATES PATENT OFFICE 2,268,623

COTTON-PICKING MACHINE

John D. Rust, Memphis, Tenn.

Application July 15, 1940, Serial No. 345,669

6 Claims. (Cl. 56—42)

The invention relates to cotton picking machines of the general type disclosed in Letters Patent #1,910,307 (Re. 19,411) May 23, 1933, #1,894,198 Jan. 10, 1933, #2,058,513, Oct. 27, 1936, #2,023,491 Dec. 10, 1935, #2,058,514 Oct. 27, 1936, #2,076,598 Apr. 13, 1937, #2,085,046 June 29, 1937, #2,073,653 Mar. 16, 1937, #2,101,100 Dec. 7, 1937, and my application Ser. #197,245, filed March 21, 1938; said cotton picking machines consisting in part of a plurality of picking spindles carried by a slotted belt or conveyor.

The present invention relates to a certain new and useful improvement in the machine, by the use of which cotton thrown off by the spindles in passing around the rear turn of the conveyor is carried back to the front of the machine and discharged onto the plant row.

In Patent #2,023,491 aforesaid, in Fig. 5, is shown an opening in the floor of the machine through which the trash is discharged from the machine. Since this trash sometimes carries with it loose cotton, such cotton is wasted by redeposit on the field at a place out of active influence of the machine. In my application Ser. #197,245 is disclosed a cotton salvaging means which will gather by suction any cotton dropped along the row of plants, including that on the ground as well as that falling from the plants as the salvaging means passes along the row. The principal object of my present invention, therefore, is to prevent the cotton which is thrown off by the spindles (the cotton which is not thrown off by the spindles is removed by the usual doffing mechanism disclosed in the patents aforesaid), as they pass tround the rear turn of the conveyor from being thrown out or discharged to the ground at places where it cannot be salvaged by the machine, and to discharge the same on the plant row so that the salvaging device can pick up the loose cotton from the ground as the machine passes along the plant rows. This result is accomplished by providing a trough below the spindle guards and utilizing the guards to convey the loose cotton from the rear end of the machine back to the front end thereof and there discharge the loose cotton onto the ground at the base of the plants so that as the salvaging device (application Ser. #197,245) comes along it will suck up the loose cotton and convey it to the salvaging sacks.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 is a plan view of a portion of a machine of the type stated embodying the present invention, only so much of a machine being shown as to make clear the invention.

Fig. 2 is an enlarged detail cross section on the line 2—2 of Fig. 1.

In the drawing, in which like numbers of reference indicate like parts in both figures, I is the casing or housing of the machine, 2 the frame, 3 the plant tunnel, 4 and 5 the conveyor shafts, 6 the conveyor chains, 7 and 8 the chain guides, 9 the spindle carrying slats, 10 the spindles, 11 the spindle guards, 12 the bottom or floor of the housing, 13 the dirt carrying wings, 14 the dirt guard or fence, and 15 one of the dirt outlets. All the foregoing may be of the usual construction and for convenience of illustration only and not limitation I have shown the invention as applied to the machine specifically described in Patent #2,023,491 (compare Figs. 5 and 12 thereof with Figs. 1 and 2 here).

In applying my present invention to this machine, I provide a trough 16 beneath the spindle guards 11, the trough having inclined sides (Fig. 2) to deflect the loose cotton down to its lowest place beneath the ends of the guards 11 so that the fingers of the guards will engage the loose cotton and drag it along the trough from the entrant end E thereof, located at the rear of the machine, to the outlet or discharge end D, near the front of the machine, the outlet D being so located as to discharge the material into the plant tunnel where it falls to the base of the plants.

From the foregoing, taken in connection with the accompanying drawing, it is thought that the invention and its merits will be clear to those skilled in the art.

What I claim is:

1. In a cotton picking machine having an endless conveyor of spindle carrying slats and having a plant tunnel, and spindle guards below the spindles, a trough extending from adjacent the rear end of the machine to adjacent the front end thereof and discharging into the plant tunnel, said trough being located beneath the spindle guards along the side of the machine opposite that having the tunnel.

2. In a cotton picking machine having an endless conveyor of spindle carrying slats and having a plant tunnel, and spindle guards below the spindles, a trough extending from adjacent the rear end of the machine to adjacent the front end thereof and discharging into the plant tunnel, said trough being located beneath the spindle guards along the side of the machine opposite that having the tunnel, said trough having inclined walls and being located with its lowest portion beneath the outer ends of the spindle guards for purposes described.

3. In a cotton picking machine having an endless conveyor of spindle carrying slats and having a plant tunnel, and spindle guards below the spindles, a trough extending from adjacent the rear end of the machine to adjacent the front end thereof and discharging into the plant tunnel, said trough being located beneath the spindle guards along the side of the machine opposite that having the tunnel, said trough having inclined walls and being located with its lowest portion beneath the outer ends of the spindle guards, and said guards comprising comb-like bodies, the ends of the comb-teeth serving to project into the cotton in the trough and carry the cotton along the trough to the discharge end of the same.

4. In a cotton picking machine wherein is provided an endless conveyor consisting of sprockets and chains carrying picking-spindle-carrying slats and having a plant tunnel along one side; means located below the lowermost spindles for conveying cotton, thrown off by the picking spindles when they leave the tunnel at the rear of the machine, through the machine to the front end thereof and discharging the cotton into the front part of the tunnel adjacent the ground, said means comprising a trough into which the cotton is thrown and means for carrying the cotton along said trough from the receiving to the discharging end of the same.

5. In a cotton picking machine wherein is provided an endless conveyor consisting of sprockets and chains carrying picking-spindle-carrying slats and having a plant tunnel along one side; means located below the lowermost spindles for conveying cotton, thrown off by the picking spindles when they leave the tunnel at the rear of the machine, through the machine to the front thereof and discharging the cotton into the front part of the tunnel adjacent the ground, said means comprising spindle guards having fingers and secured to travel with the conveyor, and a trough below the level of the guard fingers to receive the cotton and hold it for engagement by the guard fingers whereby the cotton will be carried by said fingers along the trough from the receiving end to the discharge end of the trough.

6. In a cotton picking machine of the endless conveyor type having picking-spindle-carrying slats and having a plant tunnel into which the spindles are projected and withdrawn; the combination therewith of means for receiving material thrown off from the spindles after leaving the tunnel at its rear end and means for conveying said material through the machine to the front thereof and depositing the material into the tunnel adjacent its entrant end.

JOHN D. RUST.